Figure 1:
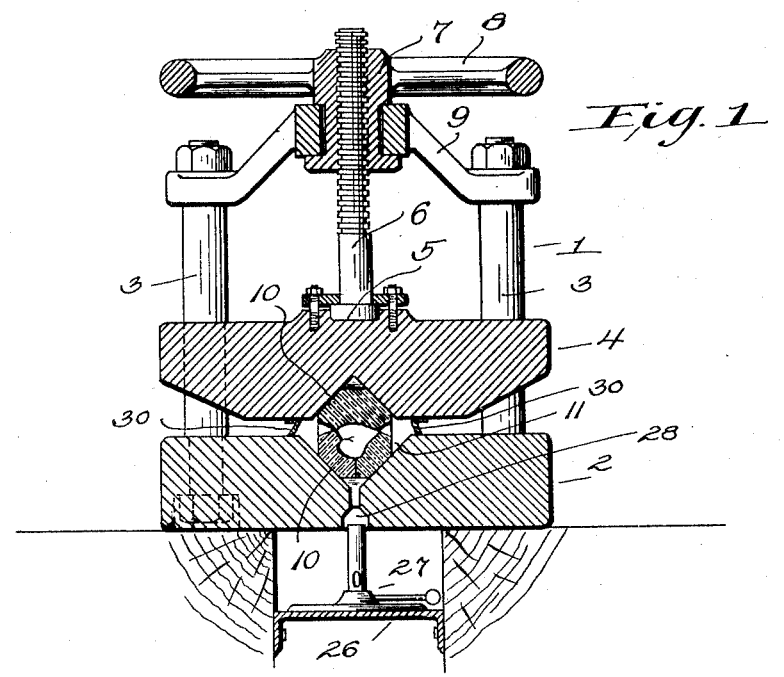

Feb. 23, 1932. C. E. BECKER 1,846,012
TOOTH MOLD
Filed May 21, 1928 3 Sheets-Sheet 1

INVENTOR.
C. E. Becker
BY W. S. McDowell
ATTORNEY.

Feb. 23, 1932.  C. E. BECKER  1,846,012
TOOTH MOLD
Filed May 21, 1928  3 Sheets-Sheet 2

INVENTOR.
C. E. Becker
BY W. S. McDowell
ATTORNEY.

Feb. 23, 1932.  C. E. BECKER  1,846,012

TOOTH MOLD

Filed May 21, 1928  3 Sheets-Sheet 3

INVENTOR.
C. E. Becker
BY W. S. McDowell
ATTORNEY.

Patented Feb. 23, 1932

1,846,012

UNITED STATES PATENT OFFICE

CARL E. BECKER, OF CAMDEN, NEW JERSEY

TOOTH MOLD

Application filed May 21, 1928. Serial No. 279,226.

This invention relates to tooth molds of the class employed in the manufacture of artificial teeth, an outstanding object of the invention residing in the provision of a mold of simple and improved construction and so designed as to permit of the rapid production of perfectly formed teeth with but minimum wear and tear on the mold proper and with greatly reduced fuel consumption in the matter of heating the molds to initially dry or bake the ceramic bodies situated therein.

It is another object of the invention to provide a tooth mold consisting of a plurality of separable parts in which the tooth forming cavities are co-operatively situated, and wherein the formation of the various sections of the composite mold is such that following the baking of the teeth said sections may readily fall apart so as to release the baked artificial teeth contained thereby, without any appreciable breakage of the teeth or injury to the mold sections. Heretofore artificial tooth molds have been formed to comprise heavy upper and lower metallic sections wherein the lower section is longitudinally grooved along its upper face for the reception of a plurality of transversely spaced longitudinally extending removable keys, the upper and lower sections of the mold together with the keys, being provided with registering pockets, depressions or mold cavities, which when the mold sections are assembled provide spaces for the reception of the ceramic materials constituting the body of an artificial tooth. The bars are held in set positions of relative registration by means of a removable, substantially wedge shaped keys, which when driven tightly into the space provided by the bars, the latter will be frictionally held in engagement with the walls of the groove formed in the lower mold sections. This mold is then placed in a press and heat is applied thereto to dry or bake the ceramic bodies contained in the cavities of the mold, which bodies subsequently form artificial teeth. Following the baking or drying operation it is then necessary to separate the upper and lower sections of the mold and to take a hammer or other similar implement, ordinarily while the mold is still hot, and drive the removable key from its wedged position between the separate bars. The bars may then be removed from the mold so as to allow the baked clay bodies or teeth to also be removed from the molded structure. It requires considerable time to carry out this operation, since the molds must be handled while they are hot and moreover, the use of the wedge or key results in damage to the mold structure, frequently in the mis-alignment of the cavities of the bars with the cavities of the upper and lower sections of the mold, resulting in very appreciable waste of the baked stock. Again, the commonly used type of mold presents difficulties to the mold carver in the matter of cutting out the registering cavities from the various parts of the mold which form the pockets for the reception of the ceramic material and moreover, due to the size or bulk of such commonly used structures very considerable time is taken in the matter of heating such molds to dry or bake the teeth.

In accordance with the present invention a mold is provided which consists of but three parts, and having a single upper section and a pair of complemental lower sections, which sections when assembled are provided with registering cavities constituting the tooth pockets. These sections are provided with bevelled or inclined outer walls which are adapted to be clamped together between the correspondingly formed walls of a press, whereby when the sections of the mold are held together in said press heat may be applied to the mold structure to bake or dry the teeth therein. The construction of the mold is such that following the heating or baking operation and when said mold is removed from the press the sections thereof, without any hampering or hitting will readily fall apart for the purpose of discharging the dried or baked tooth bodies contained therein. This arrangement permits of greater speed in the matter of tooth production, utilizes to better advantage the heat applied to the mold, and particularly avoids premature destruction of the mold by reason of the facility with which the baked tooth bodies may be removed from the cavities of the mold section.

Figure 2:
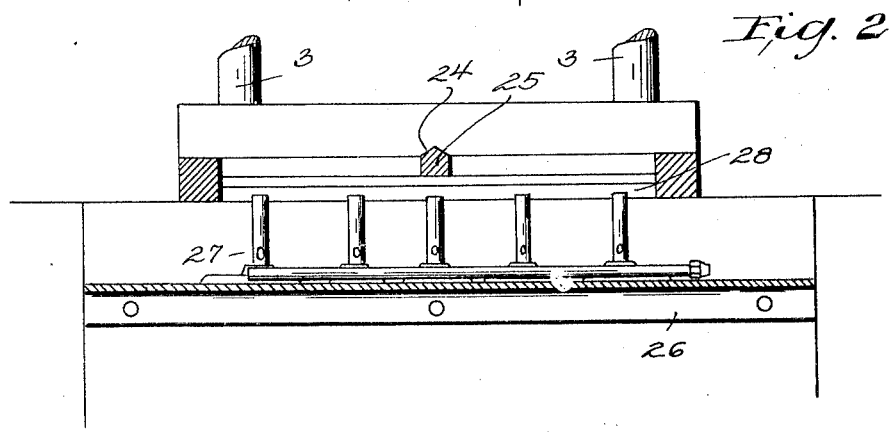
Figure 3:
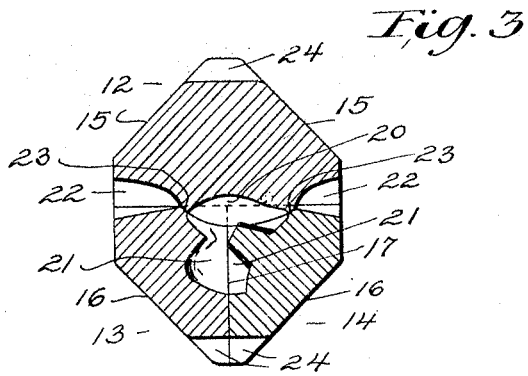
Figure 4:
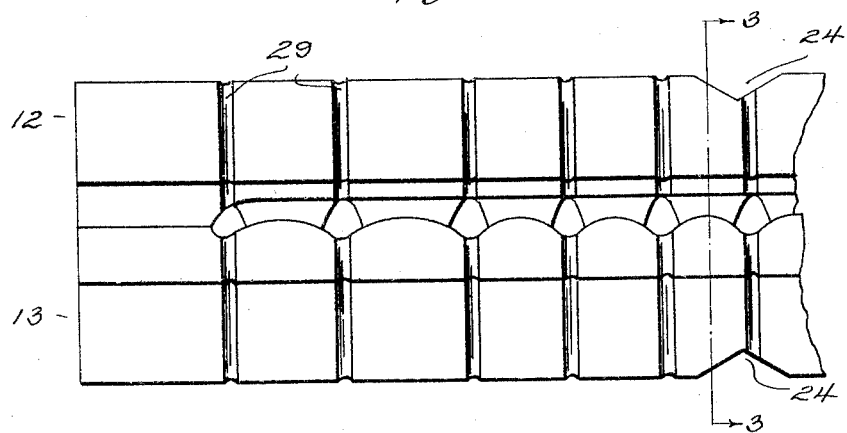
Figure 5:
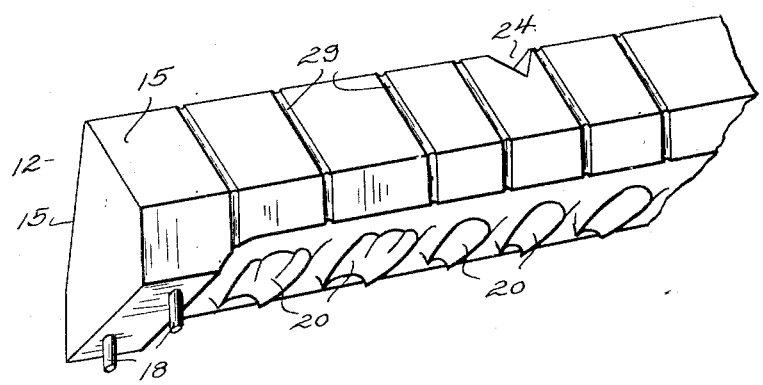
Figure 6:
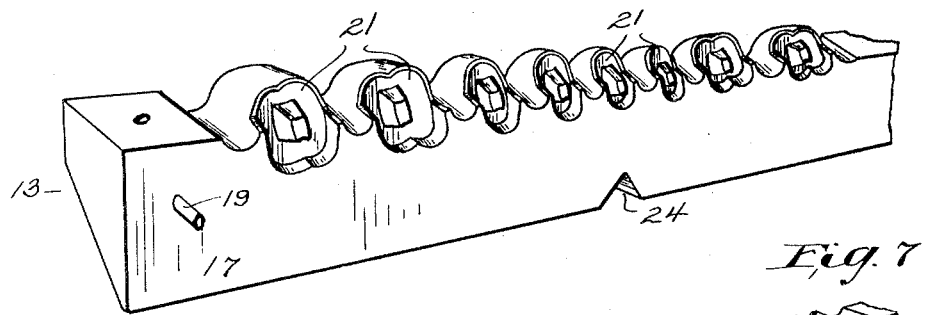
Figure 7:
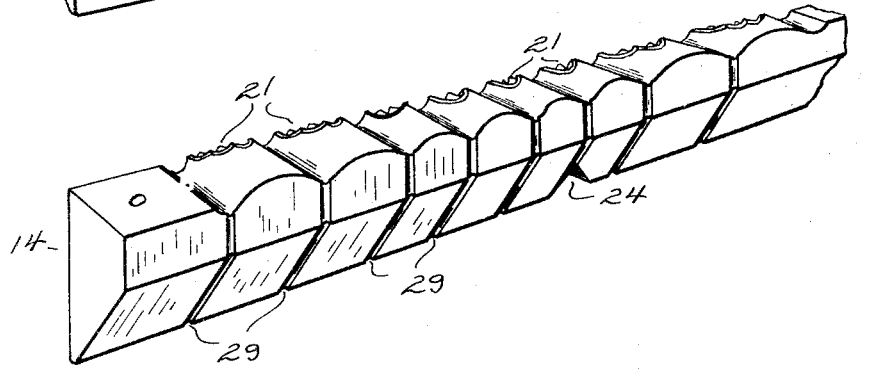

For a further understanding of the invention reference is to be had to the following description and the following drawings, wherein:

Figure 1 is a vertical transverse sectional view taken through a tooth forming mold constructed in accordance with the present invention, the mold being situated between the clamping members of a heating or drying press, Figure 2 is a vertical longitudinal sectional view taken through said drying press and a lower clamping member thereof, disclosing more particularly the burner structure of the press, the tooth mold not having been shown, Figure 3 is an enlarged transverse vertical sectional view taken through the tooth mold comprising the present invention, showing the mold on a larger scale and removed from the press, the plane of the section being indicated by the line 3—3 of Figure 4, Figure 4 is a side elevation of the mold, Figure 5 is a perspective view looking toward the under side of the top or cope section of the mold, Figure 6 is a detail perspective view showing one of the lower or drag sections of the mold, Figure 7 is a perspective view of the other lower section of the mold.

Referring more particularly to the drawings the numeral 1 designates a drying or baking press used in the manufacture of artificial teeth. This press is formed to include, in this instance, a stationary base or clamping member 2, and from which arises a plurality of spaced vertically arranged guide stems 3, and slidably carried by these stems for vertical movement with respect to the base member 2 is the movable clamping member 4 of the press. This member may be provided with a socket 5 in its upper surface adapted for the reception of the headed lower end of a screw 6, the threaded shank of the latter being adapted for the reception of the internally threaded hub 7 of an operating wheel 8. The hub 7 is journaled within the central portion of a stationary frame 9, carried by the upper ends of the stems 3. It will be seen that by rotating the upper wheel 8 relative movement between the members 2 and 4 may be effected at will.

The clamping members 2 and 4 of the press have their complemental surfaces formed to include a plurality of longitudinally extending substantially V shaped grooves 10, the walls of which being reversely inclined, as shown particularly in Figure 1. These grooves constitute a seat or pocket for the reception of the tooth mold 11 which constitutes one of the important features of the invention. The mold 11, as shown especially in Figure 3, consists of an upper or cope section 12 of cast metal and a pair of complemental lower or drag sections 13 and 14. The cope section 12 includes reversely inclined outer walls 15—15 which register with the inclined walls of the groove 10 formed in the movable clamping section 4 of the press. Similarly the sections 13 and 14 of the mold are provided with inclined outer walls 16—16, which register with the angularly disposed walls of the groove 10 formed in the base or clamping member 2 of the press. The drag sections include vertical meeting walls or faces 17—17, and it will be seen that when the mold is positioned in and clamped between the members 2 and 4 of the press, as shown in Figure 1, a uniform constant pressure is applied to all portions of the mold structure so that the latter are rigidly retained in their fixed relative positions of operation and relative movement or mis-alignment of said sections is prevented in a positive and effectual manner. To further insure this, the ends of the cope section 12 are provided with depending pins or studs 18—18 which are receivable within vertical openings formed within the ends positions of the drag sections 13 and 14. In addition the drag section 13 includes horizontally extending studs or pins 19 which are positioned within horizontal openings arranged in the other drag section 14. The pins or studs 18 and 19 thus serve to securely align the mold sections. It will be observed that the cope section or the upper section of the mold has its under surface formed to include a plurality of pockets or cavities 20, which are shaped and carefully finished to present a tooth contour. Similarly, the separable drag sections 13 and 14 are provided with registering pockets or cavities 21, adapted to be aligned with the pockets or cavities 20 so that such registering pockets or cavities 20 and 21 will produce pockets of tooth formation. The ceramic materials or compounds, such as specially prepared grades of clay, and then inserted into the pockets 20 and 21 so as to substantially fill the latter. The mold sections are then assembled and positioned in the press, in the manner indicated in Figure 1, the surplus material utilized in filling such pockets being pressed out of the mold by way of the vents 22. It will be observed that the pockets 20 and 21 have reduced meeting portions or surfaces, which possess but limited contact area, such as are indicated at 23 in Figure 3, which limited surfaces readily press out and cut off the surplus material from that remaining in the tooth pockets. The mold sections are provided intermittently of their lengths with V shaped notches 24, which receive similarly formed lugs 25 provided on the clamping members 24, the lugs and notches serving to prevent longitudinal movement of the mold sections while the latter are clamped in the press.

Supported by the frame 26 of the press and arranged below the base member 2 thereof is a burner structure 27, preferably of the Bunsen type. When the mold is positioned within the press, shown in Figure 1, combustion is effected and the heat resulting therefrom is concentrated upon the mold structure by providing the base or clamping member 2 with a longitudinally extending slot 28 arranged immediately over and in registration with the burner structure 27 and which slot is arranged at the bottom of the groove 10 provided in the base member 2. It will be observed that the sections of the mold structure are provided with grooves or passages 29 around the outer surfaces thereof, and these grooves or passages permit the heat and gasses of combustion to travel around all portions of the mold structure, thereby to quickly heat said mold structure and to permit of the baking or drying of the teeth contained therein in the shortest time and with but minimum waste or consumption of fuel. Between the clamping members 2 and 4 are arranged flexible strips 30 which serve to confine the heat around the mold structure and to prevent loss thereof to the atmosphere.

This baking or drying operation is continued for a sufficient period of time to remove moisture from the ceramic bodies or artificial teeth arranged in the cavities of the mold and to enable such bodies to maintain a desired permanency in form prior to being subjected to the firing temperatures of a final kiln operation. When the teeth have been dried sufficiently for these purposes, the press is opened taking the pressure off of the sections of the mold structure. This enables the mold structure to be readily removed from the press and owing to the peculiar construction of the mold it is not necessary to wait for the same to cool but immediately upon being removed from the press the sections of the mold may be pulled apart with ease and convenience. This enables the baking tooth bodies to be conveniently removed from the pockets or cavities of the mold in which they may be situated. This operation particularly avoids all objectionable hammering of the mold sections to effect their separation as has been necessary heretofore. Again, an important improvement resides in the fact that in the present mold structure the parts are all of approximately the same weight or body. This prevents relative shrinkage, contraction or expansion between the parts of the mold when the latter is undergoing temperature changes. In previous forms of molds the sections are of different weight or body, with the result that the heavier sections do not respond to temperature fluctuations in the same manner as the lighter sections, which has resulted in misalignment of the mold cavities and with the corresponding production of imperfect teeth or ware.

In accordance with the present invention, as above set forth, it will be seen that there is provided quite a saving in the amount of metal heated in the production of tooth molds and, moreover, since the two or three pieces, which each mold utilizes, are substantially uniform in length and nearly in weight, a practically finished mold can be turned out in the foundry, since there is but little difference in weight and can be but little difference in shrinkage, which is a very important factor in maintaining the standard sizes. The arrangement permits considerable saving to be effected in the matter of utilization of gas to dry the teeth in the press mold. Again, due to the fact that the molds may be handled while hot it is not necessary to cool the same with water following the baking or heating operation, therefore the wasting of the water from the mold will be avoided and much time and expense saved. The gas circulating grooves which have been shown in the mold sections may, of course, be formed in the press sections, if desired.

Again, by the construction of the molds the heat is readily transferred to the clay bodies or artificial teeth arranged in the molds so as to effect their drying with maximum acceleration.

It will be understood that I do not limit myself to the exact details of construction and operation above set forth but in producing my invention I may resort to such modifications and changes both in construction and operation without departing from the scope of the invention as the latter has been set forth in the following claims.

What is claimed is:

1. In apparatus for producing artificial teeth, a sectional mold having the several sections thereof provided with cavities situated to produce complete tooth forming pockets when said sections are arranged in assembled relationship, and a press having mold engaging surfaces disposed in angular relationship to vertical and horizontal axes passing through the assembled mold, said press imparting pressures to the mold sections which converge towards the axial center of said mold to positively retain said sections against relative displacement.

2. In the manufacture of artificial teeth, a drying press comprising relatively movable upper and lower clamping members, said clamping members being formed to include a pair of registered longitudinally extending substantially V shaped grooves, a tooth forming mold including a plurality of separable sections arranged to be positioned within said grooves and to be clamped between said members, said mold having the outer surfaces inclined to correspond with the adjacent surfaces of said grooves, and a burner structure carried by said press and situated in registration with said grooves to heat the mold positioned therein.

3. In mechanism for manufacturing artificial teeth, a drying press formed to include relatively movable clamping members, the adjacent walls of said clamping members being provided with longitudinally extending grooves having inclined walls, a tooth forming mold including a plurality of separable sections adapted to be positioned in said grooves and held in assembled relationship between said clamping members, said mold having inclined outer surfaces shaped to conform to the walls of said grooves, and means for heating the mold when the latter is positioned within said press.

4. In a mechanism for manufacturing artificial teeth, in combination, a drying press including a plurality of separable clamping members having the adjoining surfaces thereof formed to include longitudinally extending registering grooves, a mold including a plurality of separable sections arranged within said grooves, the sections of said mold being held together between said clamping members, a burner structure for heating the mold when arranged within said grooves, and means for circulating heat of said burner structure completely around all portion of the mold.

5. In apparatus for producing artificial teeth, a press formed to include relatively movable clamping members, the adjacent walls of said clamping members being provided with registering grooves having surfaces inclined to the vertical and horizontal planes, and a sectional tooth mold positioned between said clamping members and engaging said surfaces.

6. In apparatus for producing artificial teeth, a sectional mold having the several sections thereof provided with cavities situated to produce complete tooth forming pockets when said sections are arranged in assembled relationship, the outer surfaces of said mold sections being formed to present press engaging surfaces disposed in angular relationship to vertical and horizontal axes passing through the assembled mold, and a press formed to engage said surfaces and apply inwardly directed converging pressures upon said mold to maintain the meeting edges of the tooth forming pockets provided therein in accurate registration while the mold is retained within the press.

7. In apparatus for producing artificial teeth, a sectional mold having the several sections thereof provided with cavities situated to produce complete tooth forming pockets when said sections are in assembled relationship, the outer surfaces of said mold sections being formed to present press engaging surfaces disposed in angular relationship to vertical and horizontal axes passing through the assembled mold, and a press formed to include relatively movable clamping members arranged to engage with the angular outer surfaces of said mold sections to impart pressure to the latter which converge toward the axial center of the mold assembly, whereby the meeting edges of the tooth pockets formed by said mold sections are retained against relative separation during the retention of the mold in said press.

8. In apparatus for producing artificial teeth, a sectional mold having the several sections thereof provided with cavities situated to produce complete tooth forming pockets when said sections are in assembled relationship, the outer surfaces of said mold sections being formed to present press engaging surfaces disposed in angular relationship to vertical and horizontal axes passing through the assembled mold, a press formed to include relatively movable clamping members arranged to engage with the angular outer surfaces of said mold sections to impart pressure to the latter which converge toward the axial center of the mold assembly, whereby the meeting edges of the tooth pockets formed by said mold sections are retained against relative separation during the retention of the mold in said press, and means for heating the mold while the latter is retained in clamped relationship in said press.

9. In apparatus for producing artificial teeth, a sectional mold having the several sections thereof provided with cavities situated to produce complete tooth forming pockets when said sections are in assembled relationship, the outer surfaces of said mold sections being formed to present press engaging surfaces disposed in angular relationship to vertical and horizontal axes passing through the assembled mold, a press formed to include relatively movable clamping members arranged to engage with the angular outer surfaces of said mold sections to impart pressure to the latter which converge toward the axial center of the mold assembly, whereby the meeting edges of the tooth pockets formed by said mold sections are retained against relative separation during the retention of the mold in said press, and means for preventing longitudinal shifting of the mold relative to the clamping members of the press.

10. In apparatus for producing artificial teeth, a sectional mold having the several sections thereof provided with cavities situated to produce complete tooth forming pockets when said sections are in assembled relationship, the outer surfaces of said mold sections being formed to present press engaging surfaces disposed in angular relationship to vertical and horizontal axes passing through the assembled mold, a press formed to include relatively movable clamping members arranged to engage with the angular outer surfaces of said mold sections to impart pressure to the latter which converge toward the axial center of the mold assembly, whereby the meeting edges of the tooth pockets formed by said mold sections are retained against relative separation during the retention of the mold in said press, burners positioned behind the mold while the latter is retained within said press, and means admitting of the passage of the heated gases between the adjoining surfaces of the mold sections and said clamping members.

11. A sectional mold for producing artificial teeth comprising a three part body, each of said parts having its inner surface provided with cavities positioned to register with complemental cavities formed in the inner surfaces of the remaining parts to provide complete mold pockets of tooth shaped formation in said mold when its parts are in assembled relationship, said pockets being adapted for the reception of ceramic tooth forming materials, the outer surfaces of said mold parts being formed to present press engaging surfaces disposed in angular relationship to vertical and horizontal axes passing through the assembled mold, the arrangement of such surfaces being such that pressures applied perpendicularly thereto converge toward the axial center of the assembled mold.

In testimony whereof I affix my signature.

CARL E. BECKER.